(12) United States Patent
Park et al.

(10) Patent No.: US 11,817,541 B2
(45) Date of Patent: Nov. 14, 2023

(54) BATTERY PACK

(71) Applicant: SAMSUNG SDI CO., LTD., Yongin-si (KR)

(72) Inventors: Sanghun Park, Yongin-si (KR); Heechul Seo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 182 days.

(21) Appl. No.: 17/109,403

(22) Filed: Dec. 2, 2020

(65) Prior Publication Data
US 2021/0184198 A1 Jun. 17, 2021

(30) Foreign Application Priority Data

Dec. 11, 2019 (KR) .................... 10-2019-0164645

(51) Int. Cl.
*H01M 50/531* (2021.01)
*H01M 50/183* (2021.01)
*H01M 50/543* (2021.01)

(52) U.S. Cl.
CPC ....... *H01M 50/531* (2021.01); *H01M 50/183* (2021.01); *H01M 50/543* (2021.01)

(58) Field of Classification Search
CPC ............. H01M 50/531; H01M 50/183; H01M 50/543; H01M 50/105; H01M 50/209; H01M 50/211; H01M 50/244; H01M 50/296; H01M 50/503; H01M 50/538; H01M 50/54; H01M 50/547; H01M 50/103; H01M 2220/30; H01M 50/202; H01M 50/178; H01M 50/186; H01M 50/247; H01M 50/55; H01M 50/557;
(Continued)

(56) References Cited

U.S. PATENT DOCUMENTS 6,117,576 A * 9/2000 Sugai ................ H01M 10/0413
429/96
9,005,783 B2 4/2015 Ahn
9,209,493 B2 12/2015 Hong
(Continued)

FOREIGN PATENT DOCUMENTS

CN 101317285 A 12/2008
JP 2008300334 A * 12/2008
(Continued)

OTHER PUBLICATIONS

English translation of KR 100646497 B1 (Year: 2006).*
(Continued)

*Primary Examiner* — Ula C Ruddock
*Assistant Examiner* — Sari Ka Gupta
(74) *Attorney, Agent, or Firm* — Lee IP Law, P.C.

(57) ABSTRACT

A battery pack including a base substrate including first and second surfaces opposite to each other, an output terminal being on the first surface; and a battery cell on the second surface of the base substrate, the battery cell including an accommodation portion in which an electrode assembly is accommodated, and a terrace portion that seals the accommodation portion and which is bent toward the base substrate, an electrode tab connected to the electrode assembly being drawn out of the terrace portion and electrically connected to the output terminal.

22 Claims, 10 Drawing Sheets

(58) Field of Classification Search
CPC ............. H01M 50/588; H01M 50/595; H01M 50/284; Y02E 60/10
See application file for complete search history.

(56) References Cited

U.S. PATENT DOCUMENTS

| | | |
|---|---|---|
| 11,196,094 B2 | 12/2021 | Yun |
| 2004/0048149 A1 | 3/2004 | Gross et al. |
| 2007/0264535 A1 | 11/2007 | Lee et al. |
| 2010/0310911 A1* | 12/2010 | Yamamoto .......... H01M 50/124 429/94 |
| 2011/0104520 A1 | 5/2011 | Ahn |
| 2014/0023909 A1* | 1/2014 | Suzuki ................ H01M 50/502 429/158 |
| 2014/0037995 A1 | 2/2014 | Lee et al. |
| 2014/0212702 A1 | 7/2014 | Hur et al. |
| 2017/0092991 A1* | 3/2017 | Yun .................... H01M 50/557 |

FOREIGN PATENT DOCUMENTS

| | | | |
|---|---|---|---|
| JP | 2015-185247 A | | 10/2015 |
| KR | 10-0646497 B1 | | 11/2006 |
| KR | 100646497 B1 | * | 11/2006 |
| KR | 2008-0036743 A | | 4/2008 |
| KR | 10-0974570 B1 | | 8/2010 |
| KR | 10-1156240 B1 | | 6/2012 |
| KR | 10-1192077 B1 | | 10/2012 |
| KR | 10-2014-0098440 A | | 8/2014 |
| KR | 10-2015-0027579 A1 | | 3/2015 |
| KR | 10-2017-0038523 A1 | | 4/2017 |

OTHER PUBLICATIONS

English translation of JP-2008300334-A (Year: 2008).*
Chinese Office action dated Aug. 26, 2022.
Chinese Office Action dated Apr. 19, 2023, for corresponding Chinese Application No. 202011459064.X.
Korean Office action dated Jan. 4, 2023.

* cited by examiner

BATTERY PACK

CROSS-REFERENCE TO RELATED APPLICATION

Korean Patent Application No. 10-2019-0164645, filed on Dec. 11, 2019, in the Korean Intellectual Property Office, and entitled: "Battery Pack," is incorporated by reference herein in its entirety.

BACKGROUND

1. Field

Embodiments relate to a battery pack.

2. Description of the Related Art

Secondary batteries are rechargeable, unlike primary batteries. Secondary batteries may be used as energy sources for mobile devices, electric vehicles, hybrid vehicles, electric bicycles, uninterruptible power supplies, or the like, and depending on the types of external devices to which they are applied, the secondary batteries may be used in the form of a single battery or in the form of a battery module in which a plurality of batteries are connected and combined into one unit.

A small mobile device such as a mobile phone may operate for a certain time according to the output and capacity of a single battery; however, in the case of long-time driving or high-power driving such as in the case of an electric vehicle or a hybrid vehicle with high power consumption, a battery module including a plurality of batteries may be preferred due to output and capacity issues, and the battery module may increase the output voltage or the output current according to the number of built-in batteries.

SUMMARY

The embodiments may be realized by providing a battery pack including a base substrate including first and second surfaces opposite to each other, an output terminal being on the first surface; and a battery cell on the second surface of the base substrate, the battery cell including an accommodation portion in which an electrode assembly is accommodated, and a terrace portion that seals the accommodation portion and which is bent toward the base substrate, an electrode tab connected to the electrode assembly being drawn out of the terrace portion and electrically connected to the output terminal.

A first main surface of the accommodation portion and the second surface of the base substrate may be arranged parallel to each other.

The accommodation portion may include a front surface at which the electrode tab is drawn, a rear surface opposite to the front surface, the first main surface and a second main surface connecting the front surface to the rear surface, the first main surface and the second main surface each having a largest area among surfaces of the accommodation portion, and a pair of side surfaces connecting the front surface to the rear surface, the pair of side surfaces each having an area smaller than the area of each of the first main surface and the second main surface.

The first main surface and the second main surface may each have a larger area than that of the front surface, the rear surface, and the side surfaces of the accommodation portion.

The first main surface may correspond to the main surface distal to the terrace portion along a direction in which the first main surface and the second main surface face each other.

The battery pack may further include an adhesive member between the first main surface of the accommodation portion and the second surface of the base substrate.

The adhesive member may include a double-sided tape.

The battery cell may include a sealing portion formed along an edge of the accommodation portion to seal the accommodation portion, and the sealing portion may include the terrace portion extending from the accommodation portion in a front direction of the accommodation portion and a side sealing portion extending from the accommodation portion in a side direction of the accommodation portion.

The terrace portion and the side sealing portion may be spaced apart from each other with a gap therebetween and are respectively folded up toward a front surface and a side surfaces of the accommodation portion.

The electrode tab may include first and second electrode tabs of different polarities.

The output terminal may include a first terminal group including a pair of first and second output terminals of different polarities; and a second terminal group including a pair of first and second output terminals of different polarities.

The first and second output terminals forming the first terminal group may be spaced apart from each other along a same direction in which the first and second electrode tabs of the battery cell are spaced apart, and the first and second output terminals forming the second terminal group may be spaced apart from each other along the same direction in which the first and second electrode tabs of the battery are spaced apart.

The first terminal group and the second terminal group may be spaced apart from each other along a direction intersecting with a direction in which the first and second electrode tabs are spaced apart.

The battery pack may further include a connection tab protruding from the second surface and electrically connected to the electrode tab on the second surface of the base substrate.

The electrode tab may include first and second electrode tabs of different polarities, the connection tab may include first and second connection tabs respectively connected to the first and second electrode tabs, and a first tab including the first electrode tab and the first connection tab connected to each other and a second tab including the second electrode tab and the second connection tab connected to each other may each be between a first main surface of the accommodation portion and the second surface of the base substrate.

The battery pack may further include a tab tape around a coupling portion of the first electrode tab and the first connection tab and around a coupling portion of the second electrode tab and the second connection tab.

The first and second tabs may be between the first main surface of the accommodation portion and the second surface of the base substrate, the first and second tabs being curved to surround the accommodation portion from the terrace portion bent toward the base substrate.

The battery pack may further include a tab hole penetrating the first and second surfaces of the base substrate in the base substrate, wherein the electrode tab extends onto the first surface of the base substrate through the tab hole from the terrace portion bent toward the base substrate on a side of the second surface of the base substrate.

The electrode tab may be bent to be in parallel to the first surface of the base substrate around the tab hole to overlap the first surface.

The electrode tab may overlap the output terminal on the first surface of the base substrate and is coupled with the output terminal.

The battery pack may further include a conductive tape attached onto the electrode tab overlapping the output terminal.

The output terminal may include a first terminal group including a pair of first and second output terminals of different polarities; and a second terminal group including a pair of first and second output terminals of different polarities, the first and second terminal groups may be spaced apart from each other in a lengthwise direction of the electrode tab extending on the first surface, and the electrode tab may be coupled with the first terminal group proximate to the tab hole in the lengthwise direction of the electrode tab, among the first and second terminal groups.

BRIEF DESCRIPTION OF THE DRAWINGS

Features will be apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

Accordingly, the embodiments are merely described below, by referring to the figures, to explain aspects of the present description. As used herein, the terms "or" and "and/or" include any and all combinations of one or more of the associated listed items. Expressions such as "at least one of," when preceding a list of elements, modify the entire list of elements and do not modify the individual elements of the list.

Hereinafter, battery packs according to example embodiments will be described with reference to the accompanying drawings.

Figure 1:
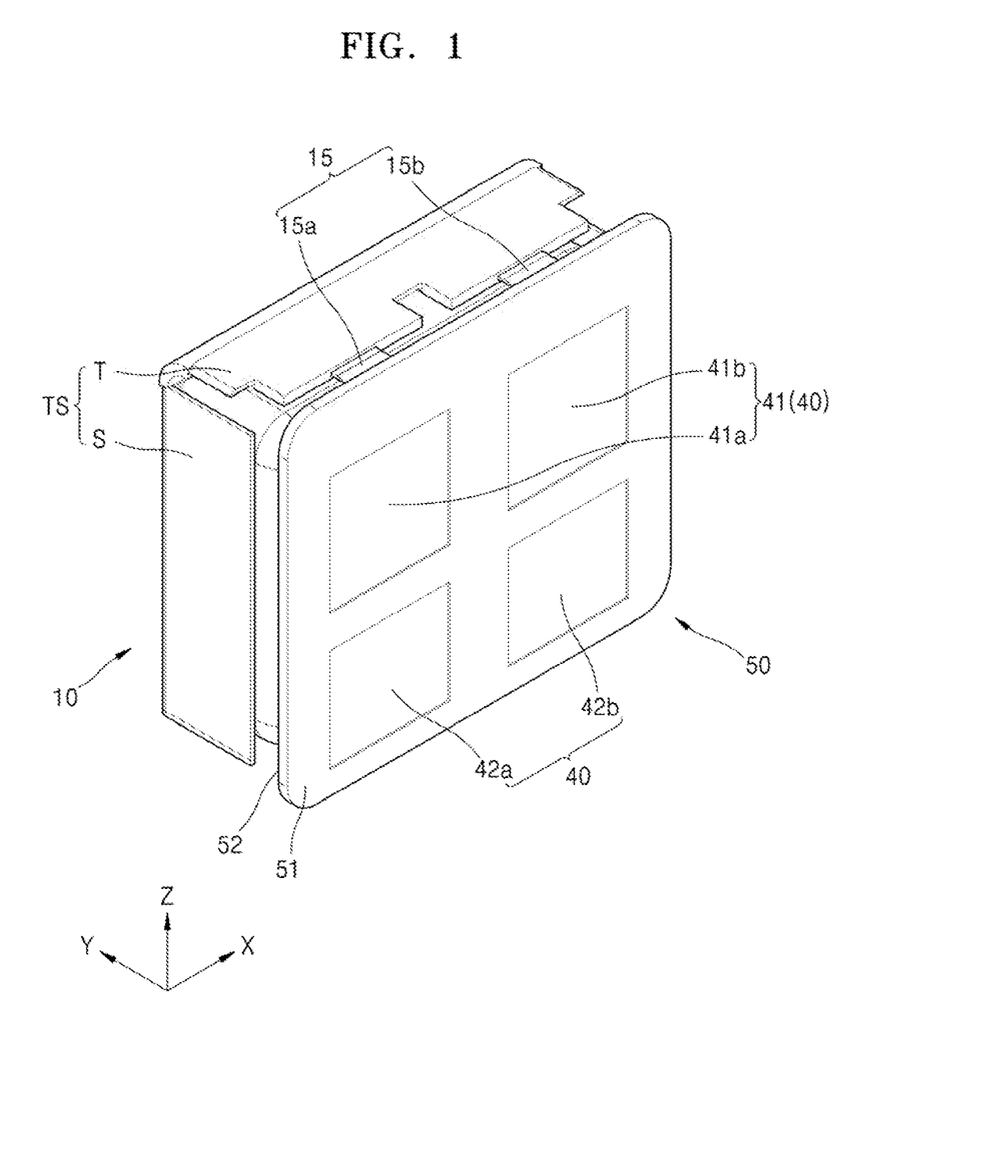
FIG. 1 is a perspective view of a battery pack according to an embodiment.
Figure 2:
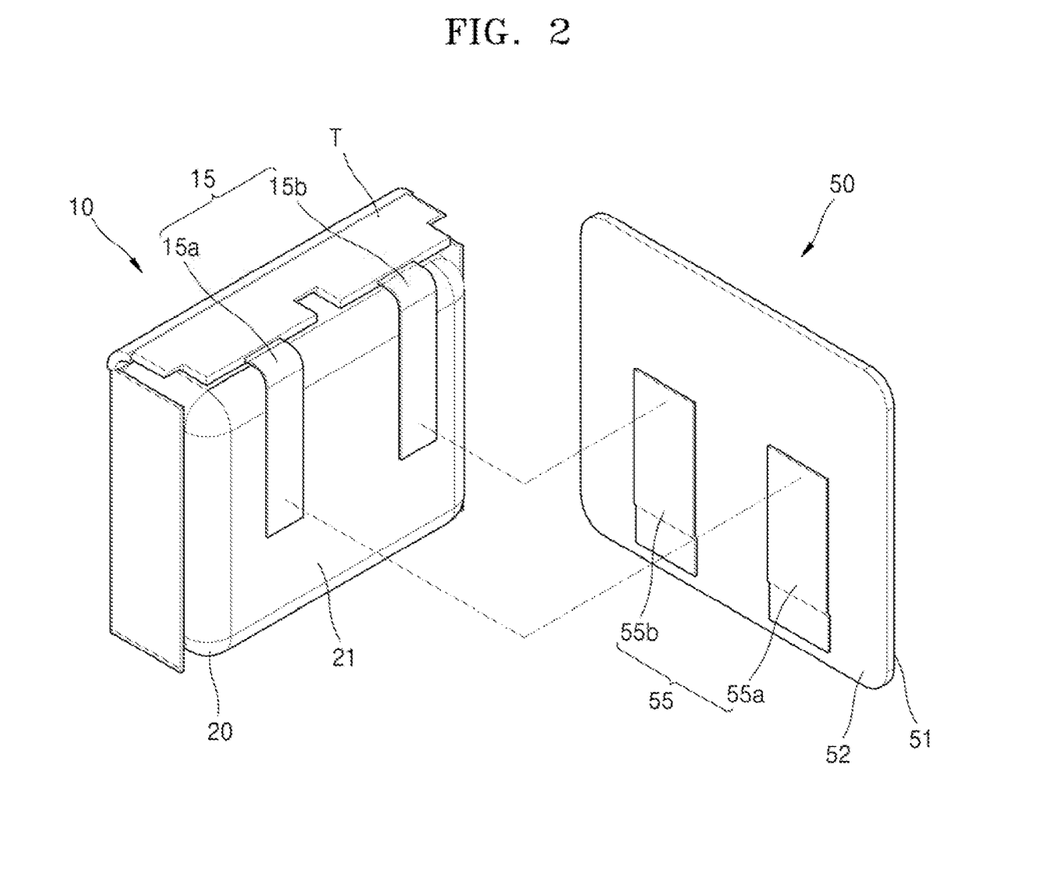
FIGS. 2 and 3 are different exploded perspective views of the battery pack of FIG. 1.
Figure 3:
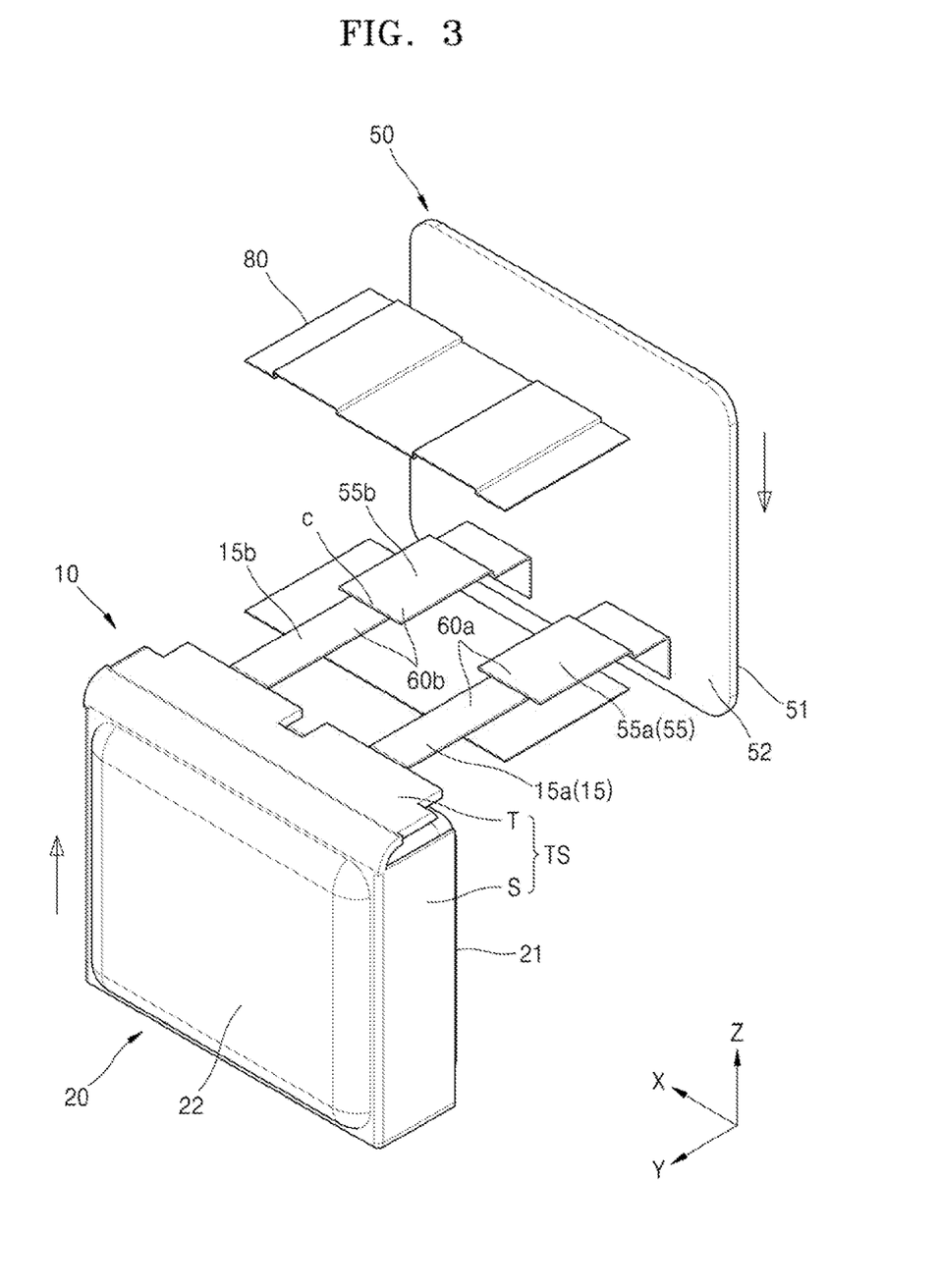
Figure 4:
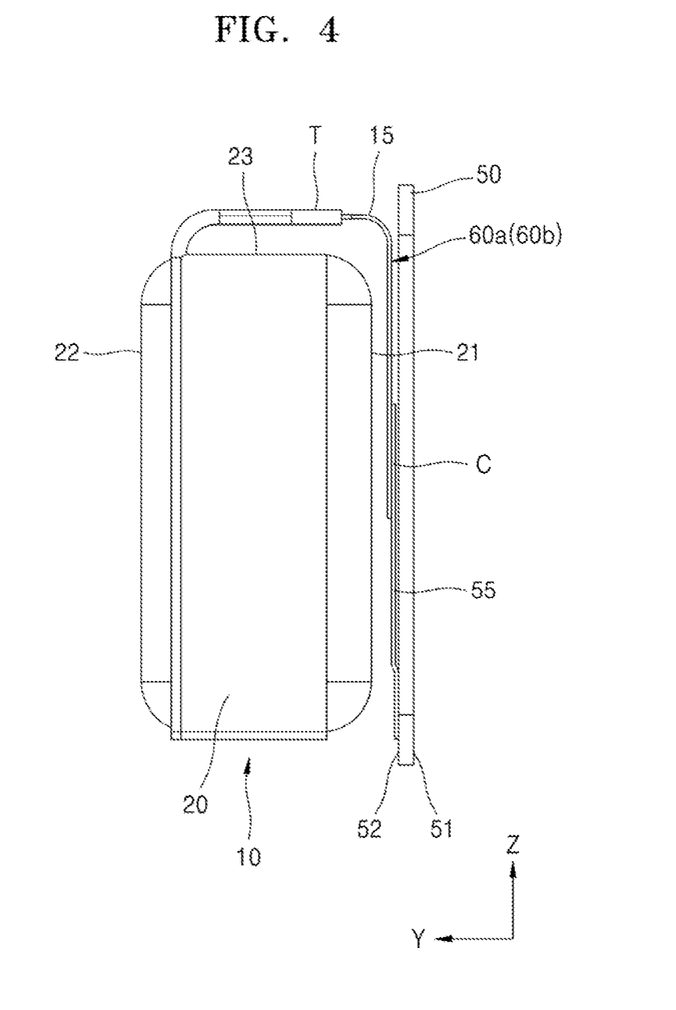
FIG. 4 is a side view of the battery pack of FIG. 1.
Figure 5A:
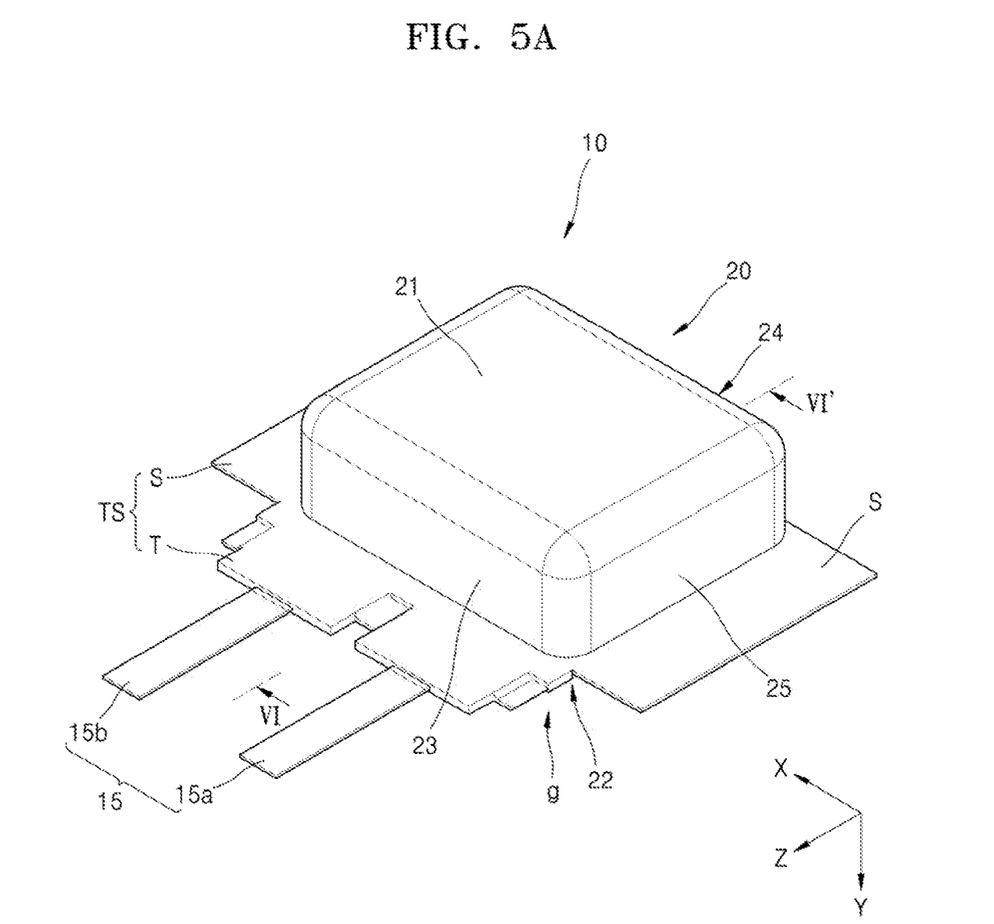
FIGS. 5A and 5B are perspective views of a battery cell of FIG. 1, which illustrate the shapes of an electrode tab before and after bending.
Figure 5B:
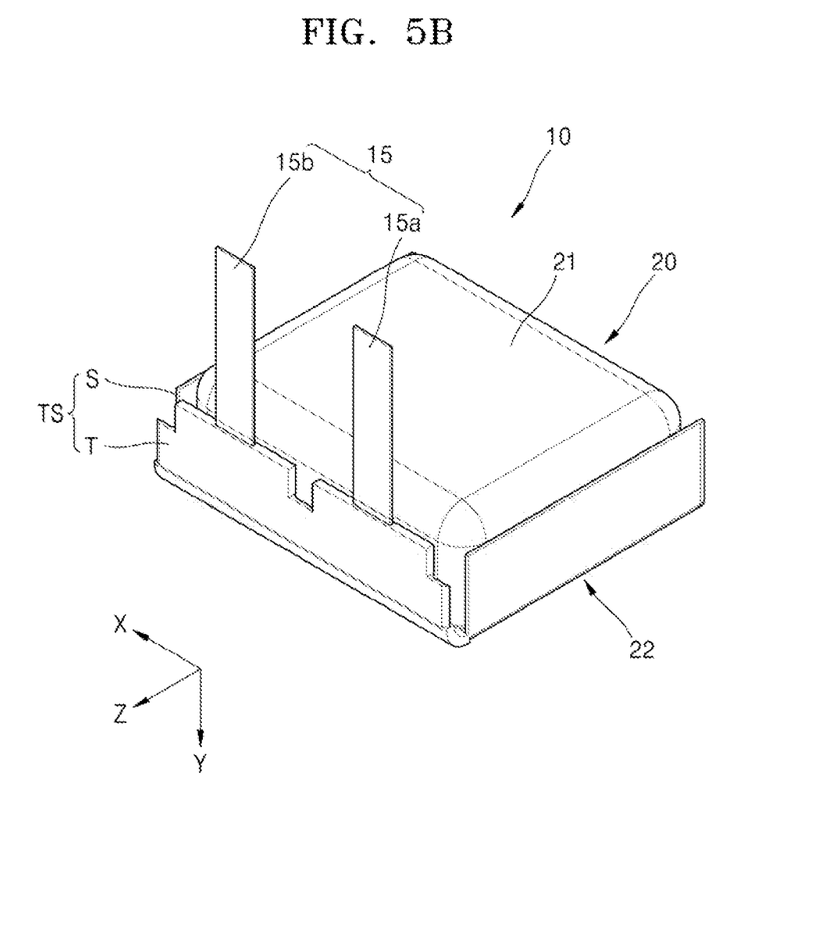
Figure 6:
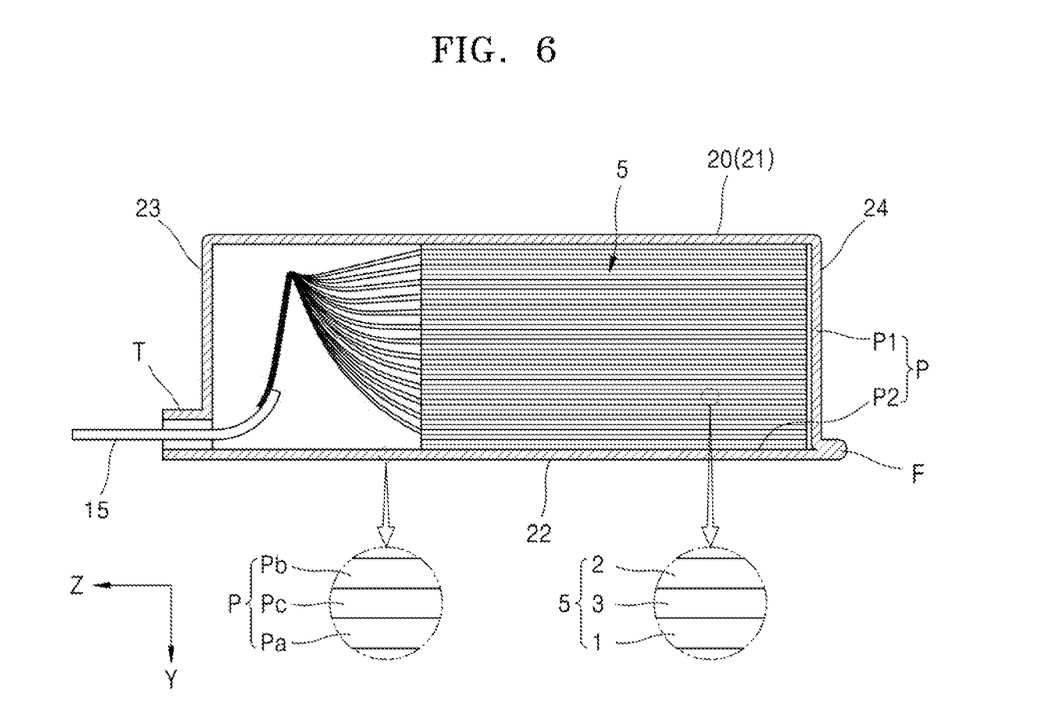
FIG. 6 is a cross-sectional view of the battery cell taken along line VI-VI' of FIG. 5A.

FIG. 1 is a perspective view of a battery pack according to an embodiment. FIGS. 2 and 3 are different exploded perspective views of the battery pack of FIG. 1. FIG. 4 is a side view of the battery pack of FIG. 1. FIGS. 5A and 5B are perspective views of a battery cell of FIG. 1, which illustrate the shapes of an electrode tab before and after bending. FIG. 6 is a cross-sectional view of the battery cell taken along line VI-VI' of FIG. 5A.

Referring to FIGS. 1 to 4, the battery pack may include a base substrate 50 including first and second surfaces 51 and 52 opposite to each other. An output terminal 40 may be on the first surface 51. A battery cell 10 may be on the second surface 52 of the base substrate 50. The battery cell 10 may include an accommodation portion 20 in which an electrode assembly (see 5 of FIG. 6) is accommodated and a terrace portion T that seals the accommodation portion 20. An electrode tab 15 may be connected to the electrode assembly 5 and may be drawn out of the accommodation portion 20 through the terrace portion T. The electrode tab 15 and the terrace portion T may be bent toward the base substrate 50.

Referring to FIGS. 5A to 6, the battery cell 10 may include the electrode assembly 5, the accommodation portion 20 accommodating the electrode assembly 5, and a sealing portion TS (see FIG. 5A) extending along edges of the accommodation portion 20 to seal the accommodation portion 20. The electrode assembly 5 may be formed in a roll shape by winding first and second electrode plates 1 and 2 (arranged to face each other) with a separator 3 therebetween, or may be formed in a stack shape by stacking a plurality of first and second electrode plates 1 and 2 with the separator 3 therebetween. An electrode tab 15 (forming a charge/discharge path) may be connected to the electrode assembly 5. The electrode tab 15 may include first and second electrode tabs 15a and 15b of different polarities that are electrically connected to the electrode assembly 5, and the electrode tab 15 connected to the electrode assembly 5 in the accommodation portion 20 may be drawn out through a front surface 23 of the accommodation portion 20.

Referring to FIG. 5A, in an embodiment, the accommodation portion 20 (in which the electrode assembly 5 is accommodated) may have a substantially cuboid shape. In an implementation, the accommodation portion 20 may include the front surface 23 (through which the electrode tab 15 is drawn), a rear surface 24 opposite to the front surface 23, a pair of main surfaces 21 and 22 connecting the front surface 23 to the rear surface 24 and occupying or having a relatively large area, and a pair of side surfaces 25 connecting the front surface 23 to the rear surface 24 and occupying or having a relatively small area. The main surfaces 21 and 22 may have the largest area among the surfaces of the accommodation portion 20, e.g., may have a larger area than each of the front surface 23, the rear surface 24, and the side surfaces 25. In an implementation, the front surface 23, the rear surface 24, and, the pair of side surfaces 25 may be connected to the main surfaces 21 and 22 at different edges along the main surfaces 21 and 22 of the accommodation portion 20. In an implementation, the main surfaces 21 and 22 and the side surfaces 25 may be in pairs at positions facing each other. In an implementation, the main surfaces 21 and 22 may include first and second main surfaces 21 and 22 facing each other.

The battery cell 10 may further include the sealing portion TS along the edges of the accommodation portion 20 to seal the accommodation portion 20. In an implementation, the accommodation portion 20 (accommodating the electrode assembly 5) and the sealing portion TS (sealing the accommodation portion 20) may be formed from an exterior material P (see FIG. 6) continuously surrounding the electrode assembly 5. In an implementation, the exterior material P may form the accommodation portion 20 (accommodating the electrode assembly 5) while surrounding the electrode assembly 5, and the other exterior material P remaining after forming the accommodation portion 20 may form the sealing portion TS sealing the accommodation portion 20.

The exterior material P (see FIG. 6) may be a flexible exterior material P, e.g., a pouch. In an implementation, the exterior material P may include a metal layer Pc (e.g., a thin aluminum plate) and insulating layers Pa and Pb (e.g., resin coating layers) on both sides of the metal layer Pc. In an implementation, the metal layer Pc may be exposed to the outside through a cross-section at which the exterior material P is terminated (e.g., at an outer edge of the exterior material P), and as described below, the metal layer Pc may be exposed through or at the edge of the sealing portion TS at which first and second exterior materials P1 and P2 coupled to face each other are coupled to each other. Referring to FIGS. 5A and 5B, different portions of the sealing portion TS may be folded toward the side surface 25 and the front surface 23 of the accommodation portion 20 such that the metal layer Pc exposed at the edge of the sealing portion TS may not protrude from the side surface 25 and the front surface 23 of the accommodation portion 20.

Referring to FIG. 6, the exterior material P may include first and second exterior materials P1 and P2 coupled to face each other with the electrode assembly 5 therebetween, and by folding the first and second exterior materials P1 and P2 to overlap each other through a folding portion F connecting the first and second exterior materials P1 and P2 to each other in a state where the electrode assembly 5 is located therebetween and then coupling portions contacting each other along the edge regions of the first and second exterior materials P1 and P2 to each other by thermal bonding or the like, the inner regions of the first and second exterior materials P1 and P2 facing each other with the electrode assembly 5 therebetween may be formed as the accommodation portion 20, and the edge regions of the first and second exterior materials P1 and P2 coupled to each other may be formed as the sealing portion TS.

The sealing portion TS may be formed along or at the edge regions of the first and second exterior materials P1 and P2 and may be formed along the side portions of the first and second exterior materials P1 and P2 (excluding the folding portion F).

Referring to FIGS. 5A and 5B, the sealing portion TS may include the terrace portion T extending from or along the front surface 23 of the accommodation portion 20 and a side sealing portion S extending from or along the side surface 25 of the accommodation portion 20. In an implementation, the terrace portion T and the side sealing portion S may be spaced apart from each other with a gap g therebetween, and as described below, the terrace portion T and the side sealing portion S may be respectively folded up toward different surfaces of the accommodation portion 20, e.g., the front surface 23 and the side surface 25, through or due to the gap g therebetween, and physical interference therebetween may be avoided. In an implementation, the electrode tab 15 (connected to the electrode assembly 5 in the accommodation portion 20) may be drawn out of the accommodation portion 20 through the terrace portion T extending from or along the front surface 23 of the accommodation portion 20.

The side sealing portion S may be folded up toward or along the side surface 25 of the accommodation portion 20, and the terrace portion T (from which the electrode tab 15 is drawn) may be folded up toward or along the front surface 23 of the accommodation portion 20. In an implementation, the side sealing portion S and the terrace portion T surrounding the accommodation portion 20 may be respectively folded up toward or along the side surfaces 25 and the front surface 23 of the accommodation portion 20, and the area occupied by the entire battery cell 10 may be reduced. In an implementation, the metal layer Pc (exposed at the edge of the side sealing portion S and the edge of the terrace portion T) may be respectively folded up toward or along the side surface 25 and the front surface 23 of the accommodation portion 20, and it may not protrude toward the side surface 25 and the front surface 23 of the accommodation portion 20. In an implementation, the electrode tab 15 drawn through the terrace portion T may be folded up toward or along the front surface 23 of the accommodation portion 20 together with the terrace portion T. In an implementation, the electrode tab 15 may be folded up toward the first main surface 21. Like the terrace portion T, the side sealing portion S may also be folded up toward the first main surface 21. Here, the first main surface 21 may refer to the main surface 21 located relatively far from (e.g., distal to) the terrace portion T (e.g., where the sealing portion TS meets the accommodation portion 20) along a direction (e.g., Y direction) in which the pair of main surfaces 21 and 22 face each other or the main surface 21 distal to the sealing portion TS including the terrace portion T and the side sealing portion S, among the pair of main surfaces 21 and 22 facing each other (e.g., the second main surface 22 may be proximate to where the sealing portion TS meets the accommodation portion 20). When the terrace portion T and the side sealing portion S are respectively folded up toward or along the front surface 23 and the side surface 25 of the accommodation portion 20, they may be folded up toward the first main surface 21 located distal thereto, and a height to which the folded-up terrace portion T and side sealing portion S may be accommodated may be secured and for example, an additional height may not be formed from the first main surface 21 (e.g., the folded terrace portion T and side sealing portion S may not extend beyond the first main surface 21).

Referring back to FIGS. 1 to 4, the battery cell 10 may be on the base substrate 50. The output terminal 40 (see FIG. 1) electrically connected to the battery cell 10 may be on the base substrate 50. The discharge power of the battery cell 10 may be provided to an external load through the output terminal 40, and the charge power from an external charger may be supplied to the battery cell 10. The output terminal 40 may include first and second output terminals 41*a*, 41*b*, 42*a*, and 42*b* of different polarities. In an implementation, the output terminal 40 may include a first terminal group 41 including a pair of first and second output terminals 41*a* and 41*b* of different polarities and a second terminal group 42 including another pair of first and second output terminals 42*a* and 42*b* of different polarities. In an implementation, the first and second output terminals 41*a* and 41*b* forming the first terminal group 41 may be spaced apart from each other along the direction in which the first and second electrode tabs 15*a* and 15*b* of the battery cell 10 face each other (e.g., X direction), and likewise, the first and second output terminals 42*a* and 42*b* forming the second terminal group 42 may be spaced apart from each other along the direction in which the first and second electrode tabs 15a and 15b of the battery cell 10 face each other. The first terminal group 41 and the second terminal group 42 may be spaced apart from each other along a direction (e.g., Z direction) intersecting with the direction in which the first and second electrode tabs 15a and 15b face each other. In an implementation, even when the first and second terminal groups 41 and 42 are spaced apart from each other, the first output terminal 41a of the first terminal group 41 and the first output terminal 42a of the second terminal group 42 may have the same polarity and may have the same potential. In an implementation, the second output terminal 41b of the first terminal group 41 and the second output terminal 42b of the second terminal group 42 may have the same polarity and may have the same potential. In an implementation, the first output terminals 41a and 42a having the same polarity and the second output terminals 41b and 42b having the same polarity may be arranged in pairs on the base substrate 50, the connection of the external load or the external charger electrically connected to the battery cell 10 may be easily made, and the electrical connection with the external load or the external charger may be easily made regardless of the terminal position of the external load or the external charger.

The base substrate 50 may include the first and second surfaces 51 and 52 opposite to each other, the output terminal 40 may be on the first surface 51 of the base substrate 50, and the battery cell 10 may be on the second surface 52 of the base substrate 50. In an implementation, the second surface 52 of the base substrate 50 and the first main surface 21 of the accommodation portion 20 may be arranged in parallel to face each other. In an implementation, an adhesive member may be between the second surface 52 of the base substrate 50 and the first main surface 21 of the accommodation portion 20. The adhesive member may bind or adhere the accommodation portion 20 and the base substrate 50 to each other. In an implementation, a double-sided tape may be applied as the adhesive member.

In an implementation, a tab tape 80 (see FIG. 3) for protecting a coupling portion C of the electrode tab 15 extending from the accommodation portion 20 and a connection tab 55 extending from the base substrate 50 may be between the second surface 52 of the base substrate 50 and the first main surface 21 of the accommodation portion 20. The tab tape 80 may also function as the adhesive member for adhering the second surface 52 of the base substrate 50 and the first main surface 21 of the accommodation portion 20 to each other. In an implementation, by using the tab tape 80 having an adhesive component on both sides, one side thereof may be attached to the coupling portion C of the electrode tab 15 and the connection tab 55 and the other side thereof may be attached to the second surface 52 of the base substrate 50 or the first main surface 21 of the accommodation portion 20.

In an implementation, as illustrated in FIGS. 2 to 4, a connection tab 55 may be on the second surface 52 of the base substrate 50. In an implementation, the connection tab 55 may protrude from the second surface 52 of the base substrate 50. The connection tab 55 may include first and second connection tabs 55a and 55b respectively connected to the first and second electrode tabs 15a and 15b of the battery cell 10. As such, the first electrode tab 15a and the first connection tab 55a connected to each other may form a first tab 60a connecting the battery cell 10 and the base substrate 50 to each other and also, the second electrode tab 15b and the second connection tab 55b connected to each other may form a second tab 60b connecting the battery cell 10 and the base substrate 50 to each other. In an implementation, the first electrode tab 15a and the first connection tab 55a may be coupled to each other through welding such as laser welding and likewise, the second electrode tab 15b and the second connection tab 55b may be coupled to each other through welding such as laser welding. In this case, a tab tape 80 (see FIG. 3) may surround the coupling portion C between the first and second electrode tabs 15a and 15b and the first and second connection tabs 55a and 55b, and the coupling portion C between the first and second electrode tabs 15a and 15b and the first and second connection tabs 55a and 55b may be surrounded by the tab tape 80 to be protected from the outside. In an implementation, the tab tape 80 may protect the coupling portion C from an external environment such as oxygen or moisture. In an implementation, the tab tape 80 may include a pair of tab tapes 80 coupled to face each other with the coupling portion C therebetween. In an implementation, the tab tape 80 may be formed of a polymer resin material, e.g., may be formed of a material such as polyimide.

Referring to FIG. 4, the first and second tabs 60a and 60b may be between the base substrate 50 and the accommodation portion 20 of the battery cell 10 (e.g., in the Y direction). In an implementation, the first electrode tab 15a (forming a portion of the first tab 60a) may be between the accommodation portion 20 and the base substrate 50 and may be curved to surround (e.g., may be bent around) the accommodation portion 20 from the terrace portion T (e.g., that is bent toward the base substrate 50). In an implementation, the terrace portion T may be bent toward the base substrate 50 (e.g., may be folded toward or along the front surface 23 of the accommodation portion 20). In an implementation, a portion of the first electrode tab 15a may be between the accommodation portion 20 and the base substrate 50. In an implementation, the first electrode tab 15a may be bent to include a portion that is parallel to the base substrate 50 and a portion that is parallel with the folded terrace portion T. Likewise, the second electrode tab 15b (forming a portion of the second tab 60b) may include a portion between the accommodation portion 20 and the base substrate 50. For example, the second electrode tab 15b may be bent to include a portion that is parallel to the base substrate 50 and a portion that is parallel with the folded terrace portion T.

Hereinafter, the coupling of the battery cell 10 and the base substrate 50 will be described in more detail. First, as illustrated in FIG. 3, the battery cell 10 and the base substrate 50 may be aligned with each other; e.g., the battery cell 10 and the base substrate 50 may be aligned such that the first and second electrode tabs 15a and 15b extending from the terrace portion T and the first and second connection tabs 55a and 55b extending from the base substrate 50 may face each other. In an implementation, when the first and second electrode tabs 15a and 15b and the first and second connection tabs 55a and 55b are arranged to face each other, the first main surface 21 of the accommodation portion 20 and the second surface 52 of the base substrate 50 may be arranged alternately (e.g., offset) with each other. In an implementation, in a state where the first main surface 21 of the accommodation portion 20 and the second surface 52 of the base substrate 50 are offset with each other rather than facing each other, the first and second electrode tabs 15a and 15b and the first and second connection tabs 55a and 55b may be arranged to face each other. In an implementation, the first and second electrode tabs 15a and 15b may be over the accommodation portion 20 along the upright direction of the accommodation portion 20 and the base substrate 50 (e.g., at a top end of the accommodation portion 20), and the first and second connection tabs 55a and 55b may be under the base substrate 50 (e.g., at a bottom end of the base substrate 50).

After the first and second electrode tabs 15a and 15b and the first and second connection tabs 55a and 55b are coupled with each other to form the first and second tabs 60a and 60b, the first and second tabs 60a and 60b may be in parallel and between the accommodation portion 20 and the base substrate 50 (e.g., as the accommodation portion 20 and the base substrate 50 are moved toward each other. In an implementation, the accommodation portion 20 may be moved upwardly and the base substrate 50 may be moved downwardly along the upright direction of the accommodation portion 20 and the base substrate 50, such that the first main surface 21 of the accommodation portion 20 and the second surface 52 of the base substrate 50 (previously offset) now face each other. In this case, the first and second tabs 60a and 60b may be located in parallel between the first main surface 21 of the accommodation portion 20 and the second surface 52 of the base substrate 50 while being bent to surround the accommodation portion 20, e.g., the accommodation portion 20 and the base substrate 50 may approach each other along the upright direction thereof while a portion of the first and second electrode tabs 15a and 15b extending from the terrace portion T and a portion of the first and second connection tabs 55a and 55b extending from the base substrate 50 are bent. As illustrated in FIG. 4, the first and second tabs 60a and 60b may be located in parallel between the accommodation portion 20 and the base substrate 50. In an implementation, an adhesive member may be between the first and second tabs 60a and 60b and the accommodation portion 20 and/or between the first and second tabs 60a and 60b and the base substrate 50, and the adhesive member may bind the accommodation portion 20 and the base substrate 50 to each other. In an implementation, the adhesive member may be between the accommodation portion 20 and the base substrate 50 at a position where the first and second tabs 60a and 60b are excluded (e.g., are not located). In an implementation, a double-sided tape may be applied as the adhesive member.

In an implementation, the tab tape 80 (see FIG. 3) covering and protecting the coupling portion C of the connection tab 55 extending from the base substrate 50 and the electrode tab 15 extending from the accommodation portion 20 may be between the accommodation portion 20 and the base substrate 50. The tab tape 80 may also function as the adhesive member for binding the accommodation portion 20 and the base substrate 50 to each other.

The base substrate 50 may include an insulating substrate and may include an insulating substrate having the output terminal 40 and the connection tab 55 at or on opposite surfaces thereof. The output terminal 40 at the first surface 51 of the base substrate 50 and the connection tab 55 at the second surface 52 of the base substrate 50 may be electrically connected to each other. The first and second output terminals 41a, 41b, 42a, and 42b at the first surface 51 may be respectively electrically connected to the first and second connection tabs 55a and 55b at the second surface 52. In an implementation, a line pattern for electrically connecting the first and second output terminals 41a, 41b, 42a, and 42b and the first and second connection tabs 55a, 55b to each other may be in the base substrate 50.

Figure 7:
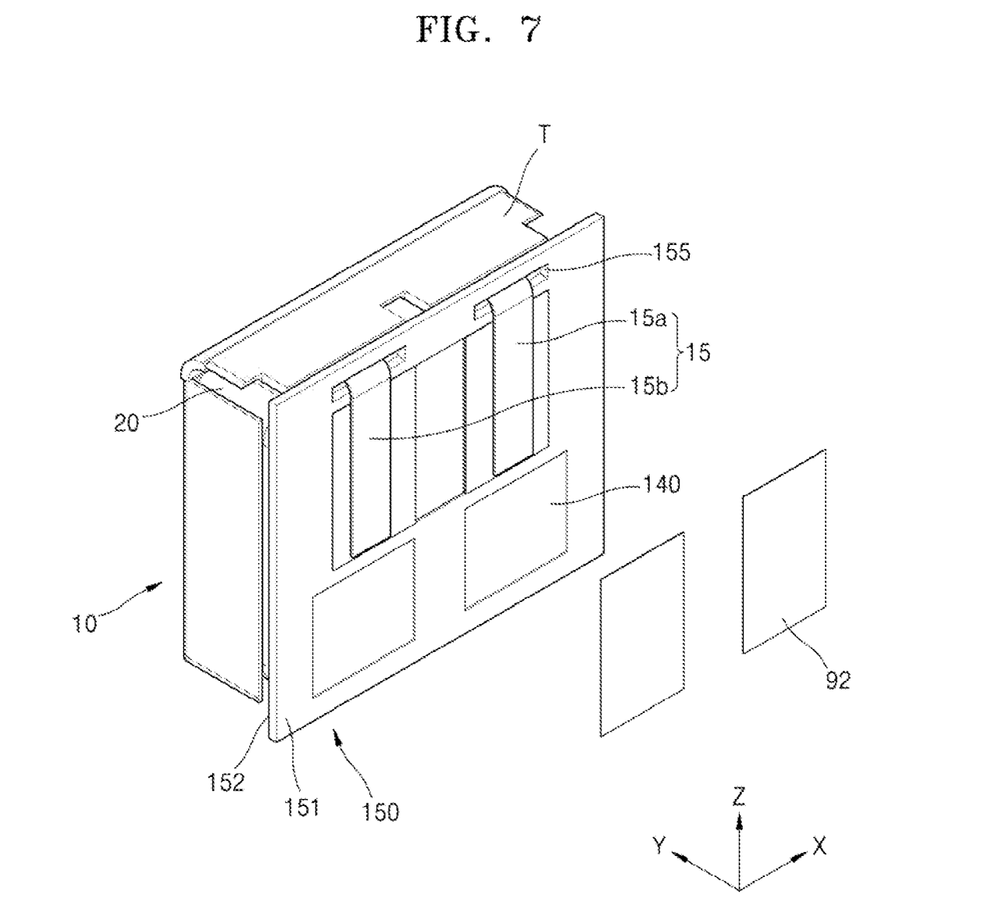
FIG. 7 is a perspective view of a battery pack according to another embodiment.
Figure 8:
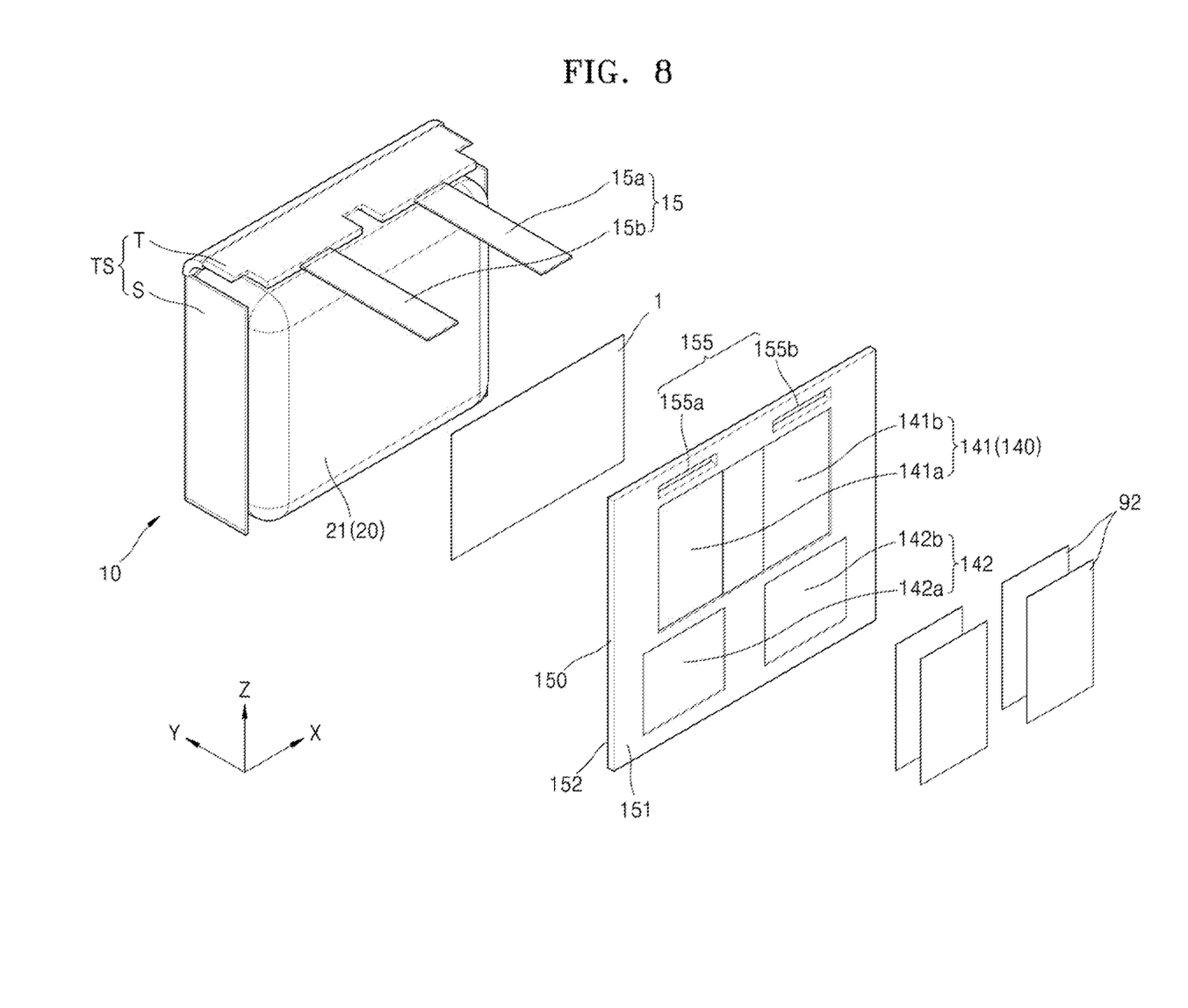
FIG. 8 is an exploded perspective view of the battery pack of FIG. 7.
Figure 9:
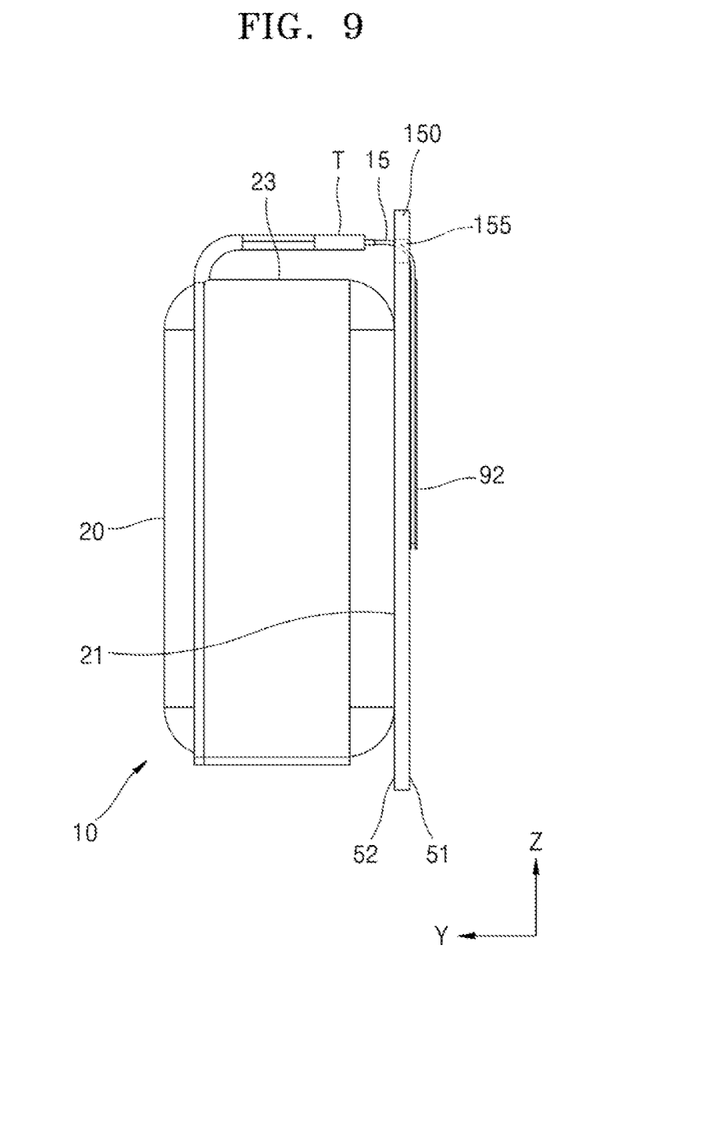
FIG. 9 is a side view of the battery pack of FIG. 7.

FIG. 7 is a perspective view of a battery pack according to another embodiment. FIG. 8 is an exploded perspective view of the battery pack of FIG. 7. FIG. 9 is a side view of the battery pack of FIG. 7.

Referring to FIGS. 7 to 9, an output terminal 140 may be on a first surface 151 of a base substrate 150, and a battery cell 10 may be on a second surface 152 of the base substrate 150. In an implementation, an electrode tab 15 (drawn from a terrace portion T bent toward the base substrate 150) may extend from or through the second surface 152 of the base substrate 150 onto the first surface 151 of the base substrate 150, e.g., through a tab hole 155 in the base substrate 150. In an implementation, the tab hole 155 in the base substrate 150 may include first and second tab holes 155a and 155b respectively at positions corresponding to first and second electrode tabs 15a and 15b.

The electrode tab 15 extending through the second surface 152 of the base substrate 150 onto the first surface 151 through the tab hole 155 of the base substrate 150 may overlap on the first surface 151 of the base substrate 150 while being bent in parallel to the first surface 151 of the base substrate 150 around the tab hole 155. In an implementation, the electrode tab 15 may overlap on the output terminal 140 on the first surface 151 of the base substrate 150. In an implementation, the electrode tab 15 overlapping on the output terminal 140 may be bound onto or adhered to the output terminal 140 by a conductive tape 92. In an implementation, the output terminal 140 on the first surface 151 of the base substrate 150 may include first and second output terminals 141a, 141b, 142a, and 142b electrically connected to the first and second electrode tabs 15a and 15b of the battery cell 10. In an implementation, the output terminal 140 may include a first terminal group 141 including the pair of first and second output terminals 141a and 141b of different polarities and a second terminal group 142 including the other pair of first and second output terminals 142a and 142b of different polarities. In an implementation, the electrode tab 15 may overlap on the first terminal group 141 and may be bound onto the first terminal group 141 by the conductive tape 92.

In an implementation, the first and second terminal groups 141 and 142 may be spaced apart from each other along the lengthwise direction of the electrode tab 15 extending on the first surface 151 (e.g., the Z direction), and in this case, the electrode tab 15 may be bound onto the first terminal group 141 among the first and second terminal groups 141 and 142, e.g., onto the first terminal group 141 where the length of the electrode tab 15 may be shortened along the lengthwise direction of the electrode tab 15. In an implementation, the electrode tab 15 may be bound onto the first terminal group 141 relatively close or proximate to the tab hole 155 along the lengthwise direction of the electrode tab 15. In an implementation, the second terminal group 142 may not be directly connected to the electrode tab 15, e.g., an external load or an external charger may be connected to the second terminal group 142. In an implementation, an external load or an external charger may be connected not only to the second terminal group 142 (not directly connected to the electrode tab 15) but also to the first terminal group 141 (directly connected to the electrode tab 15). In an implementation, the conductive tape 92 attached onto the first terminal group 141 with the electrode tab 15 therebetween may provide a connection point with the external load or the external charger.

The first terminal group 141 (to which the electrode tab 15 is bound or attached) may have a substantially rectangular shape extending long (e.g., having a long axis) along the lengthwise direction of the electrode tab 15 (e.g., the Z direction) to increase a contact area with the electrode tab 15. The second terminal group 142 (to which the electrode tab 15 is not bound or directly attached) may have a substantially rectangular shape extending long (e.g., having a long axis) along a direction intersecting with the lengthwise direction of the electrode tab 15 (e.g., the X direction) such that the electrical connection with the external load or the external charger may be easily made regardless of the terminal position of the external load or the external charger.

An adhesive member 91 may be between the first main surface 21 of the accommodation portion 20 and the second surface 152 of the base substrate 150 to bind the accommodation portion 20 and the base substrate 150 to each other. In an implementation, the adhesive member 91 may include a double-sided tape.

In an implementation, the electrode tab 15 of the battery cell 10 may be directly connected to the output terminal 140 of the base substrate 150 and may pass through the tab hole 155 in the base substrate 150, and the connection tab 55 illustrated in FIG. 2 may be omitted.

The base substrate 150 may include an insulating substrate and may include an insulating substrate having an output terminal 140 on one surface thereof. A line pattern for electrically connecting the first terminal group 141 and the second terminal group 142 (forming the output terminal 140) may be in the base substrate 150.

The remaining technical details of the battery cell 10 illustrated in FIG. 7 are substantially identical or similar to those described with reference to FIGS. 5A to 6, and thus repeated descriptions thereof may be omitted for conciseness.

In an implementation, the base substrate 50 or 150 (including the output terminal 40 or 140 for mediating the flow of a charge/discharge current) may be applied between the battery cell 10 and a set device mounted with the battery pack including the battery cell 10, and the connection structure between the battery cell 10 and the output terminals 40 or 140 may be simplified to provide a battery pack advantageous for miniaturization.

In an implementation, the first and second electrode tabs 15a and 15b of the battery cell 10 may be respectively formed of the same metal materials as the first and second electrode plates 1 and 2 of the electrode assembly 5 or formed of high-affinity metal materials with respect thereto, and the first and second electrode tabs 15a and 15b of the battery cell 10 may not be suitable for use as an output terminal. In an implementation, the battery pack may include output terminals having a different metal material than the first and second electrode tabs 15a and 15b, e.g., a different metal material than at least one of the first and second electrode tabs 15a and 15b, may include the base substrate 50 or 150 including the output terminal 40 or 140 having a larger width than the first and second electrode tabs 15a and 15b, and the electrical connection between the output terminal 40 or 140 and the set device may be smoothly made. In an implementation, the battery cell 10 may be protected from an external impact through the base substrate 50 or 150 on the battery cell 10. In an implementation, the base substrate 50 or 150 may have substantially the same size as the battery cell 10 or may have a somewhat larger size than the battery cell 10, and the battery cell 10 may be protected without a burden to the size of the entire battery pack.

According to the disclosure, it is possible to provide a battery pack that is advantageous for miniaturization by simplifying the electrical connection structure between a battery cell and an output terminal and the protection structure of the battery cell.

One or more embodiments may provide a battery pack that is advantageous for miniaturization by simplifying the electrical connection structure between a battery cell and an output terminal and the protection structure of the battery cell.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
   a base substrate including first and second surfaces opposite to each other, an output terminal being on the first surface; and
   a battery cell on the second surface of the base substrate, the battery cell including:
   an accommodation portion separate from the base substrate and in which an electrode assembly is accommodated, and
   a terrace portion that seals the accommodation portion and which is bent toward the base substrate, an electrode tab connected to the electrode assembly being drawn out of the terrace portion and electrically connected to the output terminal,
   wherein a first main outer surface of the accommodation portion and the second surface of the base substrate are arranged parallel to each other such that the first main outer surface of the accommodation portion faces away from the electrode assembly and faces toward the base substrate, and is between the electrode assembly and the second surface of the base substrate.

2. The battery pack as claimed in claim 1, wherein the accommodation portion includes:
   a front surface at which the electrode tab is drawn,
   a rear surface opposite to the front surface,
   the first main outer surface and a second main outer surface connecting the front surface to the rear surface, the first main outer surface and the second main outer surface each having a largest area among surfaces of the accommodation portion, and
   a pair of side surfaces connecting the front surface to the rear surface, the pair of side surfaces each having an area smaller than the area of each of the first main outer surface and the second main outer surface.

3. The battery pack as claimed in claim 2, wherein the first main outer surface and the second main outer surface each have a larger area than that of the front surface, the rear surface, and the side surfaces of the accommodation portion.

4. The battery pack as claimed in claim 2, wherein the first main outer surface corresponds to the main outer surface distal to the terrace portion along a direction in which the first main outer surface and the second main outer surface face each other.

5. The battery pack as claimed in claim 1, further comprising an adhesive member between the first main outer surface of the accommodation portion and the second surface of the base substrate.

6. The battery pack as claimed in claim 5, wherein the adhesive member includes a double-sided tape.

7. The battery pack as claimed in claim 1, wherein:
the battery cell includes a sealing portion formed along an edge of the accommodation portion to seal the accommodation portion, and
the sealing portion includes the terrace portion extending from the accommodation portion in a front direction of the accommodation portion and a side sealing portion extending from the accommodation portion in a side direction of the accommodation portion.

8. The battery pack as claimed in claim 7, wherein the terrace portion and the side sealing portion are spaced apart from each other with a gap therebetween and are respectively folded up toward a front surface and a side surfaces of the accommodation portion.

9. The battery pack as claimed in claim 1, wherein the electrode tab includes first and second electrode tabs of different polarities.

10. The battery pack as claimed in claim 9, wherein the output terminal includes:
a first terminal group including a pair of first and second output terminals of different polarities; and
a second terminal group including a pair of first and second output terminals of different polarities.

11. The battery pack as claimed in claim 10, wherein:
the first and second output terminals forming the first terminal group are spaced apart from each other along a same direction in which the first and second electrode tabs of the battery cell are spaced apart, and
the first and second output terminals forming the second terminal group are spaced apart from each other along the same direction in which the first and second electrode tabs of the battery are spaced apart.

12. The battery pack as claimed in claim 10, wherein the first terminal group and the second terminal group are spaced apart from each other along a direction intersecting with a direction in which the first and second electrode tabs are spaced apart.

13. The battery pack as claimed in claim 1, further comprising a connection tab protruding from the second surface and electrically connected to the electrode tab on the second surface of the base substrate.

14. The battery pack as claimed in claim 13, wherein:
the electrode tab includes first and second electrode tabs of different polarities,
the connection tab includes first and second connection tabs respectively connected to the first and second electrode tabs, and
a first tab including the first electrode tab and the first connection tab connected to each other and a second tab including the second electrode tab and the second connection tab connected to each other are each between the first main outer surface of the accommodation portion and the second surface of the base substrate.

15. The battery pack as claimed in claim 14, further comprising a tab tape around a coupling portion of the first electrode tab and the first connection tab and around a coupling portion of the second electrode tab and the second connection tab.

16. The battery pack as claimed in claim 14, wherein the first and second tabs are between the first main outer surface of the accommodation portion and the second surface of the base substrate, the first and second tabs being curved to surround the accommodation portion from the terrace portion bent toward the base substrate.

17. The battery pack as claimed in claim 1, further comprising a tab hole penetrating the first and second surfaces of the base substrate in the base substrate,
wherein the electrode tab extends onto the first surface of the base substrate through the tab hole from the terrace portion bent toward the base substrate on a side of the second surface of the base substrate.

18. The battery pack as claimed in claim 17, wherein the electrode tab is bent to be in parallel to the first surface of the base substrate around the tab hole to overlap the first surface.

19. The battery pack as claimed in claim 18, wherein the electrode tab overlaps the output terminal on the first surface of the base substrate and is coupled with the output terminal.

20. The battery pack as claimed in claim 19, further comprising a conductive tape attached onto the electrode tab overlapping the output terminal.

21. The battery pack as claimed in claim 19, wherein:
the output terminal includes:
a first terminal group including a pair of first and second output terminals of different polarities; and
a second terminal group including a pair of first and second output terminals of different polarities,
the first and second terminal groups are spaced apart from each other in a lengthwise direction of the electrode tab extending on the first surface, and
the electrode tab is coupled with the first terminal group proximate to the tab hole in the lengthwise direction of the electrode tab, among the first and second terminal groups.

22. A battery pack, comprising:
a base substrate including first and second surfaces opposite to each other, an output terminal being on the first surface;
a battery cell on the second surface of the base substrate, the battery cell including:
an accommodation portion in which an electrode assembly is accommodated, and
a terrace portion that seals the accommodation portion and which is bent toward the base substrate, an electrode tab connected to the electrode assembly being drawn out of the terrace portion and electrically connected to the output terminal; and
a tab hole penetrating the first and second surfaces of the base substrate in the base substrate,
wherein the electrode tab extends onto the first surface of the base substrate through the tab hole from the terrace portion bent toward the base substrate on a side of the second surface of the base substrate.

* * * * *